Patented Sept. 12, 1944

2,358,080

UNITED STATES PATENT OFFICE 2,358,080

METHOD OF PRETREATING CELLULOSE TO PREPARE IT FOR ESTERIFICATION

Carl J. Malm, Rochester, N. Y., assignor to Eastman Kodak Company, Rochester, N. Y., a corporation of New Jersey No Drawing. Application October 30, 1941, Serial No. 417,166

1 Claim. (Cl. 260—229)

This application relates to a method of pretreating cellulose to prepare it for esterification, particularly for the preparation of cellulose esters the acyl of which essentially consists of butyryl or propionyl, in which part of the cellulose is first treated with a small proportion of propionic acid containing sulfuric acid followed by adding the remainder of the cellulose to the pretreating bath.

In my application Serial No. 378,249, filed February 10, 1941, I described a method of pretreating cellulose to prepare it for esterification in which the predominating acid present in the pretreating liquid was acetic acid. That method of pretreatment is satisfactory for preparing cellulose esters in which the presence of at least some acetyl groups is not objectionable. However, for the preparation of cellulose esters, such as those in which substantially all of the acyl is propionyl and butyryl, that pretreatment method can only be employed if the pretreating liquid which otherwise would contribute acetyl, is removed from the pretreated cellulose prior to the esterification. This, of course, would be wasteful because of the number of operations necessary, and the discarding of the pretreating acid after the pretreatment has occurred.

One object of this invention is to provide a method of pretreating cellulose for the making of cellulose esters, the acyl of which essentially consists of propionyl and butyryl. Another object of my invention is to provide a pretreatment method which results in a pretreated cellulose which may be used directly in an esterification process which is characterized by a low liquid to cellulose ratio without previously removing any pretreating acid from the cellulose. Other objects of my invention will appear herein.

In the process of preparing cellulose esters, the acyl of which essentially consists of propionyl and butyryl, propionic and butyric anhydrides are ordinarily employed to promote the esterification. As these anhydrides are sluggish compared with acetic anhydride, their esterifying ability is improved by increasing their concentration in the esterification mixture. This can be done and the liquid to cellulose ratio in the esterification bath still be kept low by my pretreatment method.

I have found that it is possible to produce a cellulose butyrate, having the solubility properties of a straight cellulose butyrate, if propionic acid is employed in activating the cellulose as described herein. I have also found that a cellulose propionate, containing substantially no acetyl, may be prepared if propionic acid is employed in activating the cellulose as described herein. I have found that it is possible to activate cellulose to prepare it for esterification, if only a portion, such as one-half of the cellulose, is first mixed with propionic acid containing a small proportion of sulfuric acid and after the cellulose has been treated to a point where it exhibits partial physical breakdown or mechanical degradation, as evidenced by crumbliness, the remainder of the cellulose is added and the mixing is continued until the desired activation is obtained. I have found that the broken down cellulose resulting from the first part of the pretreatment process appears to lubricate the mixing of the cellulose subsequently added to the pretreatment mass so that only very small amounts of propionic acid need be employed in the pretreatment operation. I have found that the initial mechanical breakdown of the first portion of the cellulose need not be so great as to adversely affect the viscosity and physical properties of the cellulose esters prepared in accordance with my invention so that high viscosity cellulose esters may be prepared thereby.

In accordance with my invention, a pretreating liquid in an amount ¼–2 parts per part of cellulose to be esterified, essentially consisting of propionic acid and containing a small proportion of sulfuric acid, is placed in the mixer in which the esterification is to be conducted (or in some other vessel in which thorough mixing may be accomplished) and a convenient proportion of the cellulose to be esterified, such as refined cotton linters or wood pulp, is added thereto and the mixture is thoroughly mixed together. Because of the sulfuric acid, which is present in the pretreating liquid, the cellulose is almost immediately tenderized or conditioned so that it offers considerably less resistance to mixing or stirring than the same amount of cellulose under like conditions but without the sulfuric acid.

The mass of cellulose and acid is thoroughly mixed by stirring or some other form of mixing, kneading, or agitation preferably in a mixer of the Werner-Pfleiderer type. After the cellulose has been treated for a sufficient time that a sample of the cellulose when washed and dried gives a somewhat crumbly appearance, more cellulose is added. The time of this initial treatment may depend upon whether a high viscosity or a low viscosity product is being prepared. For example, if the treatment is carried out at 100° F., a time between approximately ¼ and ½ hour is preferred, with the usual proportion of catalyst, although for the preparation of a low viscosity ester, treatment for an hour is not objectionable. It is to be understood however, that ordinarily with a small proportion of catalyst a longer time of treatment may be desirable as may also be the case where a lower temperature of treatment is used. The use of a lower temperature in the pretreatment, however, may be compensated for by employing a larger proportion of catalyst. For instance using a pretreatment temperature of 70° F. and .01 part (or even .005 part) of sulfuric acid per part of cellulose a good pretreatment is obtained and the mixer in which the pretreatment is carried out runs readily. There is a relation between the proportion of catalyst, the temperature and the time employed in the pretreatment of the cellulose in the first step of the pretreatment in accordance with my invention and an undue increase in any one of these must be compensated for by a decrease in one or both of the other two and vice versa.

The addition of the remainder of the cellulose, which can be done in one or more parts although no further liquid is added does not place an undue strain on the mixer as the first portion of cellulose at this stage appears to act as a lubricant facilitating the stirring and mixing of the mass. The pretreatment under moderate conditions may be continued for approximately ¾ to one hour and the cellulose is then readily susceptible to esterification even though a very small proportion of acid is present therein.

The cellulose is then esterified by treating it with an amount of anhydride sufficient to give complete esterification. For the cellulose esters, substantially free of acetyl, in which butyryl is desired, the esterification is conducted by adding butyric anhydride. For a cellulose propionate, propionic anhydride is used. If the amount of sulfuric acid already present is not sufficient to catalyze the esterification of the cellulose, an additional amount of sulfuric acid is added. In order to assure a low liquid to cellulose ratio in the esterification mixture, no more than four parts of anhydride per part of cellulose is added, although obviously a greater proportion may be employed if desired. Due to the small proportion of liquid, present in the esterification mass relative to the cellulose therein which in turn makes for a high concentration of anhydride and catalyst, the reaction proceeds fairly rapidly and a complete reaction is assured.

If a high viscosity ester is desired, it is desirable not only to avoid excessive breakdown in the pretreatment, but also the esterification temperature should preferably be controlled so that the maximum reaction temperature does not exceed 80°–100° F. Sometimes it is necessary to cool some of the materials of the esterification mass prior to the reaction, as well as applying external cooling to the reaction vessel or mixer to obtain a cellulose ester having a high viscosity. For instance, the pretreated cellulose mass, the anhydride and the catalyst may each be cooled down to 50-60° F. or lower before the esterification is commenced, or the mixture of anhydride and the pretreated cellulose may be cooled and the catalyst, preferably cooled, may be added thereto, or the anhydride may be severely cooled and mixing it with the pretreated cellulose mass will impart a lowered temperature to the whole mass. If the temperature is allowed to rise much above 100° F., a lower viscosity ester can be expected. If a low viscosity ester is desired, the reaction temperature may be allowed to rise above 100° F., such as up to 140° F., or to some temperature between 100 and 140° F.

It is preferable to employ a lesser amount of catalyst in the esterification, if the proportion of liquid to cellulose is kept lower than that formerly employed in the making of the cellulose esters because of the higher concentration of the catalyst using a given amount than in processes in which a larger ratio of liquid to cellulose is used. I have found that in the esterification bath amounts of sulfuric acid catalyst on the order of 2% of the weight of the cellulose have been sufficient in preparing high viscosity esters in processes embodying my invention.

The minimum proportion of liquid for pretreating the cellulose should be approximately ¼ part of liquid to one part of the cellulose to be activated. My invention, however, is useful for the pretreatment of cellulose with any proportion of pretreating liquid not greater than two parts per part of cellulose. A very satisfactory ratio of pretreating liquid to cellulose is .33–.8 part per part of cellulose. This allows a good treatment or activation of the cellulose and restricts the liquid to cellulose ratio in the subsequent esterification, if only 4 parts of anhydride is employed, to not more than approximately 4.8 to 1.

The proportion of sulfuric acid employed in the pretreating liquid should be sufficient to mechanically degrade or cause partial physical breakdown of the cellulose portion treated in the initial step but should not be so great as to derogatorily affect the viscosity of the cellulose ester which is prepared from the cellulose. I have found that amounts of sulfuric acid as low as .001 part per part of cellulose up to .02 part and greater per part of cellulose initially added have given good results in pretreating the cellulose. Where a low viscosity product is desired, or where a low pretreatment temperature is employed, the larger proportions of sulfuric acid may be employed while in cases where a high viscosity product is desired or where a higher temperature of pretreatment is used the proportion of sulfuric acid should preferably be selected from the lower part of the range. An amount of sulfuric acid of approximately .005 per part of cellulose has been found to be quite suitable for pretreating cellulose at 100° F. for one-half hour.

One of the factors that governs the proportion of sulfuric acid in pretreating the cellulose is the salt content of the cellulose. The inorganic impurities present in cellulose buffer the action of the sulfuric acid in proportion to the amount of such impurities present. Therefore, the more pure the cellulose which is treated, the less proportion of sulfuric acid which is needed to obtain a selected partial breakdown of the cellulose.

As pointed out above, other factors govern the proportion of sulfuric acid which is sufficient to cause partial physical breakdown of the cellulose without derogatorily affecting the viscosity of the cellulose ester formed in the subsequent esterification process. If a lower pretreatment temperature is used, such as 70°, 80° or 90° F. or temperatures therebetween, a greater proportion of sulfuric acid, a longer time for treatment of the initial portion of cellulose, or both is ordinarily necessary in pretreating the cellulose. If on the other hand, higher pretreating temperatures, such as 120° or 130° F. or even higher, are used, either less time of treatment of the initial portion of cellulose, a less proportion of sulfuric acid or both may be necessary to avoid derogatorily affecting the cellulose.

Usually concentrated sulfuric acid is employed in the pretreatment, however, because of the small amount employed a more dilute sulfuric acid may be employed if present in an effective amount. The small amount of water thereby added is insignificant compared with the amount of water supplied by the cellulose even though the latter may have a moisture content of only 1 or 2%.

If the pretreatment is carried out in a mixer or like vessel in which a previous esterification has been carried out so that the vessel contains, as a residue, some of the reaction mixture prepared therein, allowance should be made for the sulfuric acid supplied thereby in making up the pretreating liquid. For instance, if 400 lbs. of cellulose is to be esterified and the pretreating liquid is to contain 0.4 lb. of sulfuric acid; if the residue from a previous esterification in the reaction vessel supplies 0.2 lb. of sulfuric acid, it is only necessary to add 0.2 lb. of sulfuric acid to the pretreating liquid to impart the desired sulfuric acid concentration to the pretreating liquid.

Although I have found that the use of approximately one-half of the cellulose to be esterified in the first step of the pretreatment is ordinarily most convenient in accordance with my invention, other convenient portions of the cellulose may be added particularly where the mixer is capable of handling the portion added. If desired, only a one-quarter portion of the cellulose may be added initially and the cellulose, after this initial treatment, will facilitate the treatment of the remaining cellulose particularly when a minimum of pretreating liquid is employed. On the other hand, a three-quarter portion of the cellulose may be added initially, particularly where an undue strain is not placed upon the mixer thereby and especially where an amount of pretreating liquid near the permissible maximum is employed. The most convenient initial portions of cellulose to use are ordinarily found within the range of ¼–½ of the total cellulose to be esterified, although other proportions outside of this range which are found to be convenient, may be employed.

After the initial treatment, the remainder of the cellulose is added in one or more portions and the treatment is continued until the cellulose has been activated to the desired degree without derogatorily affecting the cellulose ester prepared therefrom. At 100° F., one hour is usually sufficient for this second pretreatment step, although one-half hour has been satisfactory for this step. With lower pretreatment temperatures a longer time for the second step will be desirable unless the sulfuric acid proportion is increased, and vice versa.

The following examples illustrate my invention:

Example I

A mixture of one pound of propionic acid and 1 cc. of sulfuric acid (sp. gr. 1.84) was placed in a Werner-Pfleiderer mixer and 1½ lbs. of refined cotton linters was added thereto. The mass was mixed together for ½ hour at approximately 100° F. An additional 1½ lbs. of cellulose was added and the mixing was continued for 3 hours at 100° F. 12 lbs. of butyric anhydride were then added and the mixture was cooled to 55° F. 10 cc. of sulfuric acid was then thoroughly mixed in and the reaction was allowed to proceed to a maximum temperature of 95° F. After 9 hours reaction, a clear viscous dope was obtained. Solubility tests on this product and on products obtained by hydrolyzing this ester showed their solubility properties are similar to those of straight cellulose butyrates.

Example II

1½ lbs. of cellulose were added to ¾ lb. of propionic acid containing 1 cc. of sulfuric acid in a Werner-Pfleiderer mixer. The mass was mixed together for one hour at 100° F. An additional 1½ lbs. of cotton linters were added and the mixing was continued for 2 hours. 10 lbs. of propionic anhydride and 2 lbs. of propionic acid were added to the mass and the mixture was cooled to 50° F. 10 cc. of sulfuric acid was then mixed in and the reaction was allowed to proceed to a maximum temperature of 90° F., stirring being continued all the while. After 12 hours reaction, a viscous, clear solution of cellulose propionate was obtained.

The term "parts," when referred to herein and in the claim appended hereto, refers to parts by weight.

I claim:

A method of pretreating cellulose to prepare it for esterification which comprises mixing 1½ pounds of the cellulose with a pretreating liquid essentially consisting of 1 pound of propionic acid and 1 cc. of sulfuric acid for ½ hour at approximately 100° F., adding an additional 1½ pounds of the cellulose to the mass and continuing the mixing for 3 hours at approximately 100° F., whereby the cellulose is rendered susceptible to the action of acetylating reagents.

CARL J. MALM.